US010169701B2

(12) United States Patent
Hosokawa et al.

(10) Patent No.: US 10,169,701 B2
(45) Date of Patent: Jan. 1, 2019

(54) NEURON PERIPHERAL CIRCUITS FOR NEUROMORPHIC SYNAPTIC MEMORY ARRAY BASED ON NEURON MODELS

(71) Applicant: International Business Machines Corporation, Armonk, NY (US)

(72) Inventors: Kohji Hosokawa, Shiga-ken (JP); Masatoshi Ishii, Shiga-ken (JP); SangBum Kim, Yorktown Heights, NY (US); Chung H. Lam, Peekskill, NY (US); Scott C. Lewis, Eastham, MA (US)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 14/722,008

(22) Filed: May 26, 2015

(65) Prior Publication Data

US 2016/0350643 A1 Dec. 1, 2016

(51) Int. Cl.
*G06N 3/063* (2006.01)
*G06N 3/04* (2006.01)

(52) U.S. Cl.
CPC .......... *G06N 3/0635* (2013.01); *G06N 3/049* (2013.01)

(58) Field of Classification Search
CPC ................. G06N 3/0635; G06N 3/049
See application file for complete search history.

(56) References Cited

U.S. PATENT DOCUMENTS

| 5,148,514 | A * | 9/1992 | Arima ................. G06N 3/063 706/25 |
| 7,512,572 | B2 * | 3/2009 | Furber ................. G11C 8/06 706/15 |
| 7,904,398 | B1 * | 3/2011 | Repici ................. G06N 3/08 706/15 |
| 8,447,714 | B2 | 5/2013 | Breitwisch et al. ........... 706/33 |
| 8,589,320 | B2 | 11/2013 | Breitwisch et al. ........... 706/15 |
| 8,959,040 | B1 * | 2/2015 | Cruz-Albrecht ....... G06N 3/049 706/39 |
| 9,710,747 | B2 | 7/2017 | Kang ................. G06N 3/049 |
| 2004/0139040 | A1 * | 7/2004 | Nervegna ............. G06N 3/063 706/15 |

(Continued)

OTHER PUBLICATIONS

Seo, J., et al., "A 45nm CMOS neuromorphic chip with a scalable architecture for learning in networks of spiking neurons", Custom Integrated Circuits Conference (CICC), 2011 IEEE, pp. 1-4.

*Primary Examiner* — Douglas King
(74) *Attorney, Agent, or Firm* — Ido Tuchman; Erik Johnson

(57) ABSTRACT

A neuromorphic memory system including neuromorphic memory arrays. Each neuromorphic memory array includes rows and columns of neuromorphic memory cells. A column of postsynaptic circuits is electrically coupled to postsynaptic spike timing dependent plasticity (STDP) lines. Each postsynaptic STDP line is coupled to a row of neuromorphic memory cells. A column of summing circuits is electrically coupled to postsynaptic leaky integrate and fire (LIF) lines. Each postsynaptic LIF line is coupled to the row of neuromorphic memory cells at a respective memory array. Each summing circuit provides a sum of signals from the postsynaptic LIF lines to a respective postsynaptic circuit.

11 Claims, 12 Drawing Sheets

(56) References Cited

U.S. PATENT DOCUMENTS

| | | | |
|---|---|---|---|
| 2005/0015351 A1* | 1/2005 | Nugent | G06N 3/063 706/33 |
| 2012/0140545 A1* | 6/2012 | Kim | G11C 7/04 365/148 |
| 2016/0371582 A1 | 12/2016 | Eleftheriou | G06N 3/049 |

* cited by examiner

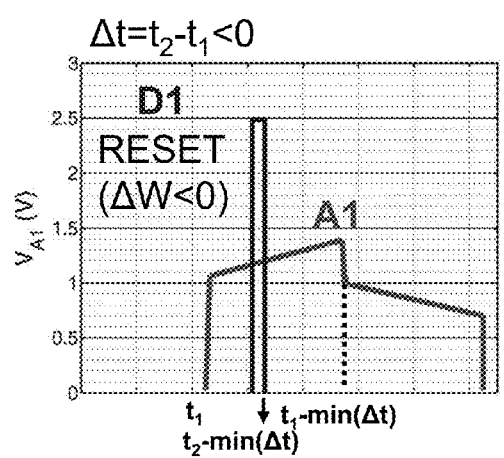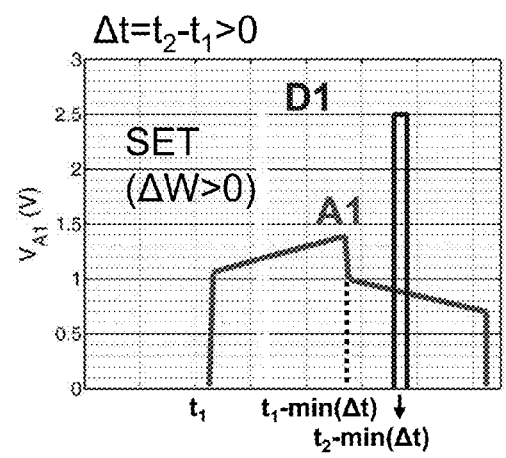
Fig. 9A                                Fig. 9B

NEURON PERIPHERAL CIRCUITS FOR NEUROMORPHIC SYNAPTIC MEMORY ARRAY BASED ON NEURON MODELS

BACKGROUND

This invention relates generally to memory circuits, and more particularly to neuromorphic memory systems for neuromorphic applications.

The term "neuron" was coined by Heinrich Wilhelm Gottfried von Waldeyer-Hartz in 1891 to capture the discrete information processing units of the brain. The junctions between two neurons were termed "synapses" by Sir Charles Sherrington in 1897. Information flows only along one direction through a synapse, thus we talk about a "presynaptic" and a "postsynaptic" neuron. Neurons, when activated by sufficient input received via synapses, emit "spikes" that are delivered to those synapses that the neuron is presynaptic to.

It is theorized that experiences are captured as conductance of the synapses in the brain. The synaptic conductance changes with time as a function of the relative spike times of presynaptic and post-synaptic neurons. The conductance of a synapse increases if a postsynaptic neuron fires after its pre-synaptic neuron fires, and decreases in conductance if the order of the two firings is reversed. Furthermore, the change depends on the precise delay between the two events, such that the more the delay, the less the magnitude of change.

Neuromorphic systems, also referred to as artificial neural networks, are computational systems that permit electronic systems to essentially function in a manner analogous to that of biological brains. Neuromorphic systems do not generally utilize a traditional digital model of manipulating 0s and 1s. Instead, neuromorphic systems create connections between processing elements that are roughly functionally equivalent to neurons of a biological brain. Neuromorphic systems may include various electronic circuits that model biological neurons.

BRIEF SUMMARY

Accordingly, one example aspect of the present invention is a neuromorphic memory system. The neuromorphic memory system includes a plurality of neuromorphic memory arrays. Each neuromorphic memory array includes rows and columns of neuromorphic memory cells. The neuromorphic memory system further includes a column of postsynaptic circuits and a column of summing circuits. Each postsynaptic circuit is electrically coupled to a plurality of postsynaptic spike timing dependent plasticity (STDP) lines. Each postsynaptic STDP line is coupled to a row of neuromorphic memory cells at a respective memory array. Each summing circuit is electrically coupled to a plurality of postsynaptic leaky integrate and fire (LIF) lines. Each postsynaptic LIF line is coupled to the row of neuromorphic memory cells at the respective memory array. Each summing circuit provides a sum of signals from the postsynaptic LIF lines to a respective postsynaptic circuit.

Another example aspect of the present invention is a method for generating a memory program pulse in a neuromorphic memory circuit. The neuromorphic memory circuit includes a presynaptic neuron circuit coupled to a postsynaptic neuron circuit by a resistive memory cell. The method includes receiving a target STDP behavior function h(Δt), where Δt=$t_2$-$t_1$, $t_2$ is a time when presynaptic neuron fires, and $t_2$ is a time when postsynaptic neuron fires. The target STDP behavior function h(Δt) describes a desired relative change in synaptic weight of the resistive memory cell based on Δt. The method further includes receiving a memory cell characteristic function $f_{VD1}(V_{A1})$, where $V_{A1}$ is a voltage of the presynaptic STDP pulse, and VD1 is an amplitude of the postsynaptic STDP pulse. The memory cell characteristic function $f_{VD1}(V_{A2})$ describes a relationship between change in an electrical resistance of the resistive memory cell and $V_{A1}$ at a constant VD1. A transmitting operation transmits the presynaptic STDP pulse as $f_{VD1}^{-1}$(h (t+min(Δt)-$t_1$)) on a presynaptic STDP line A1, where t is time and min(Δt) is a constant time shift. The presynaptic STDP pulse controls a current flow through the resistive memory cell when the postsynaptic STDP pulse is generated at t2-min(Δt).

A further example aspect of the present invention is a method for controlling a neuromorphic memory system. The neuromorphic memory system includes a presynaptic neuron circuit coupled to a postsynaptic neuron circuit by a resistive memory cell. The method includes generating a presynaptic LIF pulse on a presynaptic LIF line at time $t_1$. An activating operation activates an access transistor coupled to the presynaptic LIF line in response to the presynaptic LIF pulse. The access transistor enables LIF current to pass through the resistive memory cell to a postsynaptic LIF line. An integrating operation integrates the LIF current at the postsynaptic LIF line over time. A comparing operation compares a LIF voltage at the postsynaptic LIF line to a threshold voltage. A generating operation generates a postsynaptic spike timing dependent plasticity (STDP) pulse on a postsynaptic STDP line if the LIF voltage is beyond the threshold voltage.

Yet a further example aspect of the present invention is a neuromorphic memory system. The system includes a resistive memory cell and a presynaptic neuron circuit. The presynaptic neuron circuit is configured to generate a presynaptic LIF pulse on a presynaptic LIF line at time $t_1$. An access transistor coupled to the presynaptic LIF line is activated in response to the presynaptic LIF pulse. The access transistor enables LIF current to pass through the resistive memory cell to a postsynaptic LIF line. A postsynaptic neuron circuit includes a LIF capacitor electrically coupled to the postsynaptic LIF line. The LIF capacitor is configured to integrate the LIF current at the postsynaptic LIF line over time. A LIF discharge line at the postsynaptic neuron circuit is coupled to the postsynaptic LIF line. The LIF discharge line is configured to discharge the LIF capacitor over time. The postsynaptic neuron circuit includes a LIF comparator electrically coupled to the postsynaptic LIF line. The LIF comparator is configured to compare a LIF voltage at the LIF capacitor to a threshold voltage and generate the postsynaptic STDP pulse on a postsynaptic STDP line if the LIF voltage is beyond the threshold voltage.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 9A shows example presynaptic and postsynaptic STDP pulses at a $\Delta$t less than zero.

FIG. 9B shows example presynaptic and postsynaptic STDP pulses at a $\Delta$t greater than zero.

DETAILED DESCRIPTION

Figure 1:
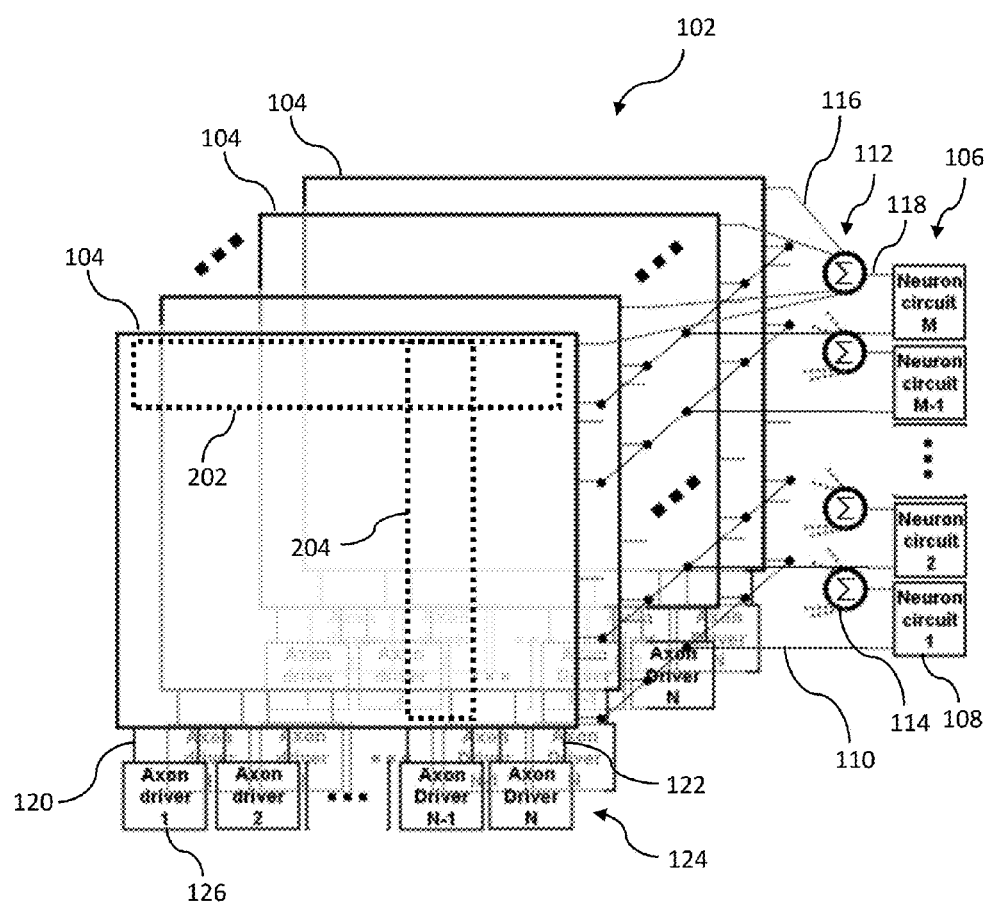
FIG. 1 shows an example neuromorphic memory system contemplated by the present invention.

The present invention is described with reference to embodiments of the invention. Throughout the description of the invention reference is made to FIGS. 1-12. When referring to the figures, like structures and elements shown throughout are indicated with like reference numerals.

Neuromorphic computing is motivated by the computational method used by the biological brains (more specifically mammal cerebral cortex) mainly comprised by neurons and synapses. Computational methods used by the biological brains are quite different from that of today's computer systems which is based on the Von Neumann architecture. Therefore, solid state devices that enable the neuromorphic applications in a power and area efficient manner require a new device concept organized in a new array structure.

Solid state non-volatile resistive memory elements can be used to emulate the function of synapses in a cerebral cortex. The function of neurons in a cerebral cortex can be modeled by a neuron circuit. Neuron circuit blocks can be designed to program and read an array of resistive memory elements. The present invention relates to neuron circuits that can be used to drive a synaptic memory array. As discussed in detail below, the neuron circuits can provide signals to program synaptic memory cells based on spike timing dependent plasticity (STDP) model, and can provide signals to read synaptic memory cells based on leaky integrate and fire (LIF) neuron model.

A neuron behavior model may include a presynaptic neuron connected to a postsynaptic neuron via a synapse. The following variables can be defined for a neuron behavior model:

$V_{pre}(t)$ is a membrane potential of presynaptic neuron (as a function of time).

$V_{post}(t)$ is a membrane potential of postsynaptic neuron (as a function of time).

w is a synaptic weight. Synaptic weight is the influence that a presynaptic firing will have on postsynaptic neuron.

Synaptic weights are plastic or adaptive, and change through time. Synaptic weight exhibits two forms of plasticity: (a) long-term and (b) short-term. Long-term changes in the transmission properties of synapses provide a physiological substrate for learning and memory, whereas short-term changes support a variety of computations. The mechanism of short-term plasticity is a form of gain control.

$t_1$ is a time when presynaptic neuron fires.

$t_2$ is a time when postsynaptic neuron fires.

Furthermore, the behavior model defines two functions:

Leaky integrate and fire (LIF) is a function that determines the $V_{post}$ of the cell body. When the presynaptic neuron fires, $\Delta V_{post}$ is proportional to w.

Spike timing dependent plasticity (STDP) is a function that determines w. $\Delta$w is a function of $\Delta$t ($t_2-t_1$). In other words, $\Delta$w is a function of the timing difference between postsynaptic and presynaptic neuron firing. In one example of STDP, synapses are only strengthened if the firing of their presynaptic neuron precede, and thus could have contributed to, the firing of the post synaptic neuron. Accidental, non-causal coincidences will weaken synapses.

Embodiments of the present invention can include neuromorphic memory cells. U.S. patent application Ser. No. 14/596,223 filed Jan. 14, 2015 and titled "NEUROMORPHIC MEMORY CIRCUIT", and incorporated herein in its entirety, discloses neuromorphic memory cells. Such neuromorphic memory cells include a two transistor, one resistor (2T-1R) structure, with one transistor is used for LIF functionality and the other transistor is used for STDP functionality. By doing so, different pulse lengths can be used for LIF and STDP operations. Specifically, a first transistor is coupled to a relatively long STDP pulse and a second transistor is coupled to a relatively short LIF pulse. As discussed below, it is contemplated that other neuromorphic memory cell structures may be utilized by embodiments of the present invention.

FIG. 1 shows an example neuromorphic memory system 102 contemplated by the present invention. The neuromorphic memory system 102 includes a plurality of neuromorphic memory arrays 104.

Figure 2:
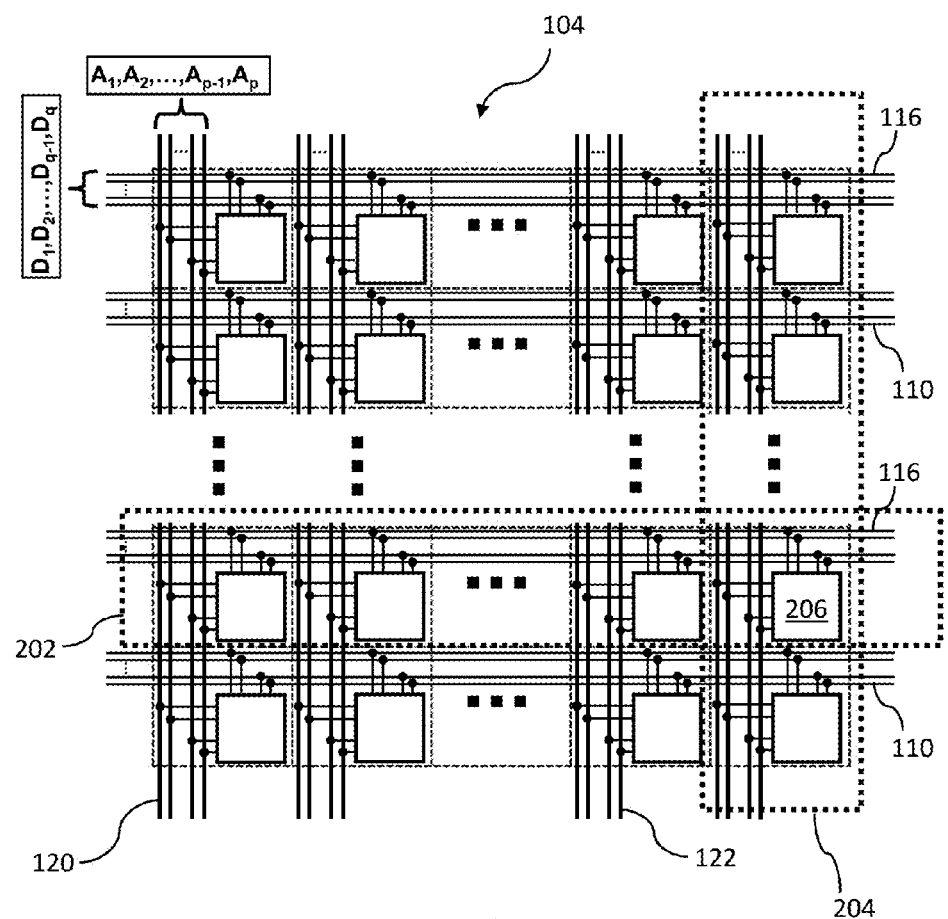
FIG. 2 shows an example neuromorphic memory array including rows and columns of neuromorphic memory cells.

FIG. 2 shows a neuromorphic memory arrays 104 in accordance with one embodiment of the present invention. The neuromorphic memory array 104 includes rows 202 and columns 204 of neuromorphic memory cells 206. The memory array 104 may, for example, include 1024×1024 memory cells. Furthermore, q postsynaptic lines are shared by synaptic memory cells on the same row and p presynaptic lines are shared by synaptic memory cell on the same column. The present invention focuses on two presynaptic lines 120 and 122 and two postsynaptic lines 110 and 116 out of all presynaptic and postsynaptic lines which might be included in the neuromorphic memory arrays 104.

In one embodiment, each neuromorphic memory cell 206 includes a phase change material. In phase change memory, information is generally stored in materials that can be manipulated into different phases. Each of these phases exhibit different electrical properties which can be used for storing information. The amorphous and crystalline phases are typically two phases used for bit storage (1's and 0's) since they have detectable differences in electrical resistance. Specifically, the amorphous phase (also referred to as the reset state) has a higher resistance than the crystalline phase (also referred to as the set state).

In a particular embodiment, the phase change material is composed of $Ge_xSb_yTe_z$, where a Ge atomic concentration x is within a range from 30% to 70%, a Sb atomic concentration y is within a range from 10% to 30%, and a Te atomic concentration z is within a range from 20% to 50%. The phase change material may include an initial state with an initial electrical resistance between the set electrical resistance and the reset electrical resistance. Furthermore, the initial state is at a lower potential energy than the set state and the reset state such that the electrical resistance of the phase change material programmed to either the set state or the reset state drifts toward the initial electrical resistance over time. In other words, the set and reset states are metastable states, and the initial state is the ground state.

Turning back to FIG. 1, the neuromorphic memory system 102 includes a column of postsynaptic circuits 106 (also referred to herein as neuron circuits). Each of the postsynaptic circuits 108 is electrically coupled to a plurality of postsynaptic STDP lines 110. Each of the postsynaptic STDP lines 110 is coupled to a row of neuromorphic memory cells 202 at a respective memory array 104.

The neuromorphic memory system 102 includes a column of current summing circuits 112. Each of the postsynaptic LIF lines 116 is coupled to the row of neuromorphic memory cells 202 at the respective memory array 104. Each of the current summing circuits 114 is electrically coupled to a plurality of postsynaptic LIF lines 116. Thus, postsynaptic LIF lines 116 on the same row from all synaptic memory arrays 104 are connected to input terminals of the same the current summing circuit 114. The current summing circuit 114 adds all the signals on the input terminal and delivers the sum to the output terminal 118. In other words, each of the current summing circuits 114 provides a sum of current from the postsynaptic LIF lines 116 to a respective postsynaptic circuit 108 at its output 118. As discussed in detail below, the output terminal 118 of the current summing circuit 114 is connected to a V(t) node of the postsynaptic circuit 108 on the same row.

Figure 3:
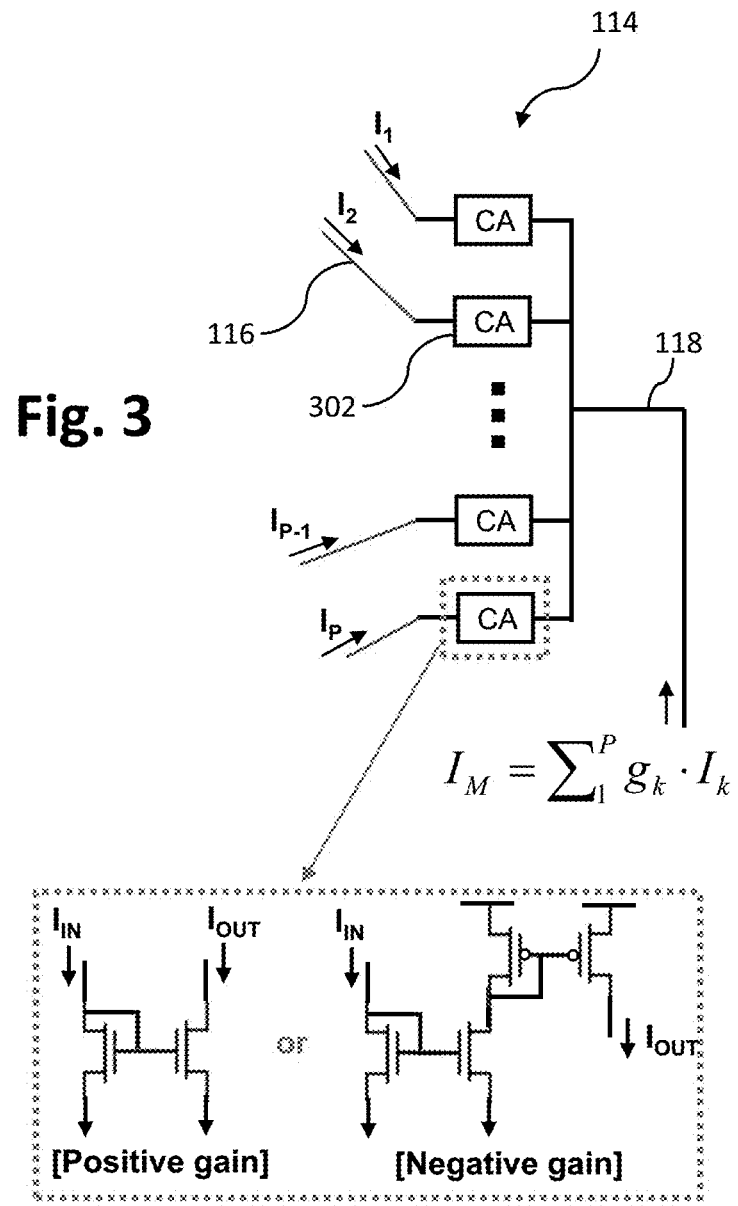
FIG. 3 shows an example summing circuit contemplated by the present invention.

FIG. 3 shows an example summing circuit 114 contemplated by the present invention. Each summing circuit 114 includes a plurality of current amplifiers 302. Each of the current amplifiers 302 is coupled to and receives current from a respective postsynaptic LIF line 116 from one of the neuromorphic memory arrays 104. The output 118 of each current amplifier 302 is coupled to its respective postsynaptic circuit 108 (see FIG. 1). The current summing circuit output $I_M$ is equal to the sum of the individual currents $I_k$ at the postsynaptic LIF lines 116 multiplied by a gain $g_k$ of its respective current amplifier 302. As shown in FIG. 3, the current amplifiers 302 may be positive gain amplifiers or negative gain amplifiers, depending on design requirements.

If the signals on the postsynaptic LIF lines 116 are current, multiple current amplifiers 302 can be used to add those signals. In one embodiment, the current amplifiers 302 are implemented with a current mirror. The current amplifiers 302 do not necessarily use the same gain. For example, a more important memory array can be assigned a higher gain. Memory arrays of equal importance can be assigned the same gain. Gains can be adjusted by changing transistor sizes.

Figure 4:
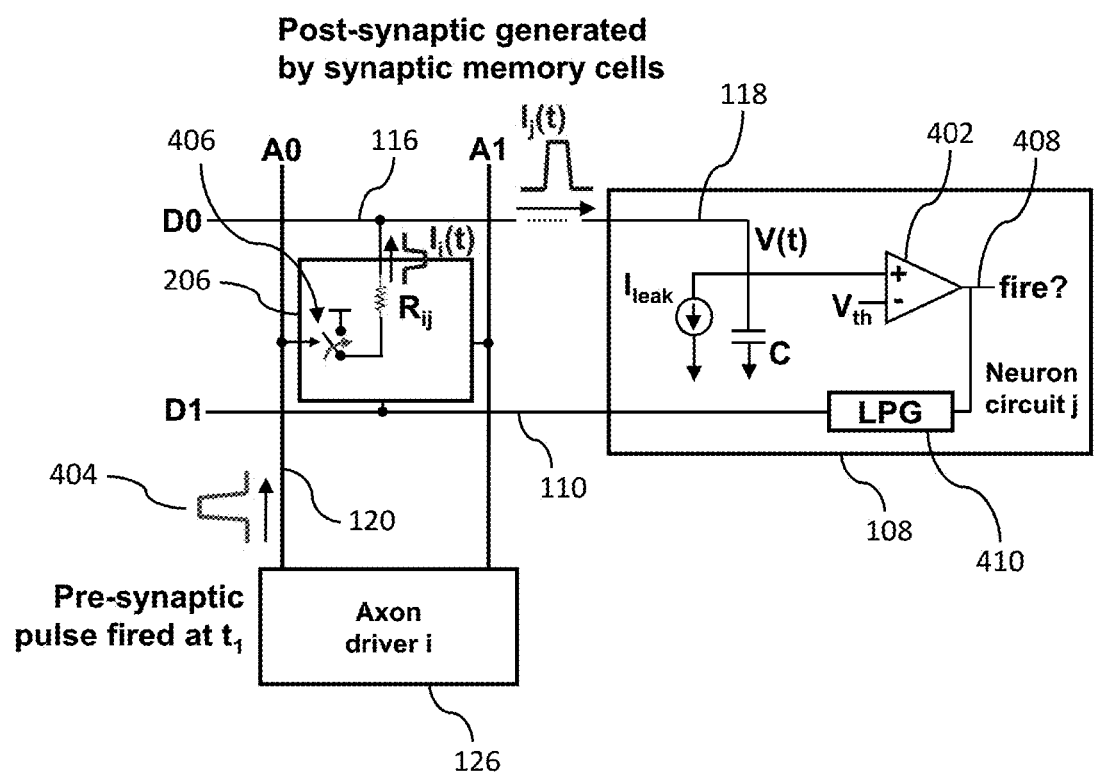
FIG. 4 illustrates an example postsynaptic circuit coupled to an individual memory and operation of a presynaptic driver circuit and a postsynaptic driver circuit during an LIF stage, as contemplated by one embodiment of the present invention.

FIG. 4 illustrates an example postsynaptic circuit 108 coupled to a single memory cell 206 for simplicity and clarity. The postsynaptic circuit 108 performs three main operations: 1. integrate an LIF current at the current summing output 118 over time, 2. compare the LIF voltage V(t) to a threshold voltage $V_{th}$, and 3. generate a postsynaptic STDP pulse at the respective postsynaptic STDP line 110 if the LIF voltage V(t) is beyond the threshold voltage $V_{th}$. In one embodiment, V(t) is beyond the threshold voltage $V_{th}$ when it rises above $V_{th}$. In another embodiment, V(t) is beyond the threshold voltage $V_{th}$ when it falls below $V_{th}$.

In one embodiment, each postsynaptic circuit 108 includes a LIF capacitor C electrically coupled to the current summing output 118. The LIF capacitor C is configured to integrate the LIF current over time. A LIF discharge line $I_{leak}$ coupled to the current summing output 118 is configured to slowly discharge the LIF capacitor over time. A LIF comparator 402 is electrically coupled to the current summing output 118. The LIF comparator 402 is configured to compare the LIF voltage V(t) to the threshold voltage $V_{th}$ and trigger learning pulse generator (LPG) 410 to generate the postsynaptic STDP pulse if the LIF voltage V(t) is beyond the threshold voltage $V_{th}$.

Turning back to FIG. 1, the neuromorphic memory system 102 includes a plurality of presynaptic LIF lines 120 and presynaptic STDP lines 122. A column of neuromorphic memory cells 204 is coupled to a respective presynaptic LIF line 120 and a respective presynaptic STDP line 122.

The neuromorphic memory system 102 further includes a plurality of presynaptic driver circuit rows 124. Thus, each presynaptic driver circuit row 124 is coupled to a respective neuromorphic memory array 104. Each presynaptic driver circuit row 124 includes a plurality of presynaptic driver circuits 126 (also referred to as axon drivers). Each of the presynaptic driver circuits 126 is coupled to the respective presynaptic LIF line 120 and the respective presynaptic STDP line 122.

FIG. 4 also illustrates operation of the presynaptic driver circuit 126 and postsynaptic driver circuit 108 during an LIF stage, as contemplated by one embodiment of the present invention. The presynaptic driver circuit 126 generates a presynaptic LIF pulse 404 on the respective presynaptic LIF line 120 at time $t_1$. The presynaptic LIF pulse 404 activates an access transistor 406 coupled to the respective presynaptic LIF line 120. The access transistor 406 enables LIF current to pass through the neuromorphic memory cell 206 to the respective postsynaptic LIF line 116.

By generating a presynaptic LIF pulse 404 on the respective presynaptic LIF line 120, the presynaptic driver circuit 126 causes multiple synaptic memory cells 206 on presynaptic LIF line 120 to generate a signal on their own postsynaptic LIF line 116. The signal on the postsynaptic LIF lines 116 generated by each synaptic memory cell 206 is determined by the synaptic weight stored in each synaptic memory cell 206. When a postsynaptic circuit 108 fires, the presynaptic driver circuit 126 corresponding to the firing postsynaptic circuit 108 generates a signal on the presynaptic STDP line (A1) to program the synaptic memory cell 206 based on the STDP algorithm. The presynaptic driver circuit 126 corresponding to the firing postsynaptic circuit 108 may reside in a different neuromorphic memory system 102 from the neuromorphic memory system in which the firing postsynaptic circuit resides. The combination of the presynaptic STDP line (A1) signal and the postsynaptic STDP line (D1) signal determines the memory cell's programming characteristics.

Figure 5:
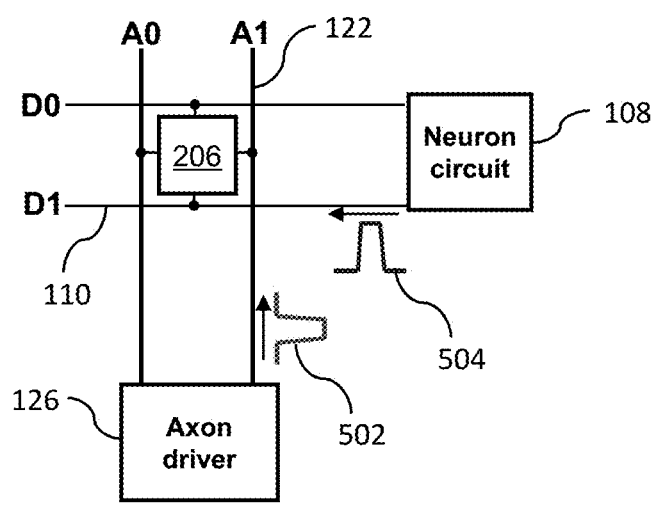
FIG. 5 shows operation of a presynaptic driver circuit and a postsynaptic driver circuit during an STDP stage, as contemplated by one embodiment of the present invention.

FIG. 5 illustrates operation of the presynaptic driver circuit 126 and the postsynaptic driver circuit 108 during an STDP stage, as contemplated by one embodiment of the present invention. During the STDP stage, each presynaptic driver circuit 126 starts transmitting a presynaptic STDP pulse 502 at the respective presynaptic STDP line 122 at time $t_1$. The postsynaptic circuit 108 generates a postsynaptic STDP pulse 504 at time $t_2$−min($\Delta t$) on the respective postsynaptic STDP line 110 if, as discussed above, the LIF voltage V(t) is beyond the threshold voltage $V_{th}$, where min($\Delta t$) is a constant time shift.

The presynaptic STDP pulse 502 controls a current flow through a respective neuromorphic memory cell 206 when the postsynaptic STDP pulse is generated 504. The presynaptic STDP pulse 502 is characterized by the equation $f_{VD1}^{-1}(h(t+\min(\Delta t)-t_1))$, where t is time, h is a target STDP behavior function describing a desired relative change in synaptic weight of the neuromorphic memory cells based on the time difference between when the postsynaptic neuron fires ($t_2$) and the presynaptic neuron fires ($t_1$), and $f_{VD1}$ is a memory cell characteristic function describing a relationship between change in an electrical resistance of the neuromorphic memory cells 206 and a voltage of the presynaptic STDP pulse 502 at a voltage of the postsynaptic STDP pulse 504.

During the LIF stage, the presynaptic driver circuit 126 sends out a pulse on A0 if the presynaptic neuron fires at $t_1$. The synaptic memory cell 206, which receives a signal on A0, generates a signal on D0 that is proportional to the stored weight. As discussed above, the postsynaptic circuit 108 integrates signals on D0 generated by multiple synaptic memory cells 206. The postsynaptic circuit 108 may integrate the leak signal on D0 along with signals generated by multiple synaptic memory cells 206. When the integrated signals crosses the threshold, the postsynaptic circuit 108 fires.

Figure 6:
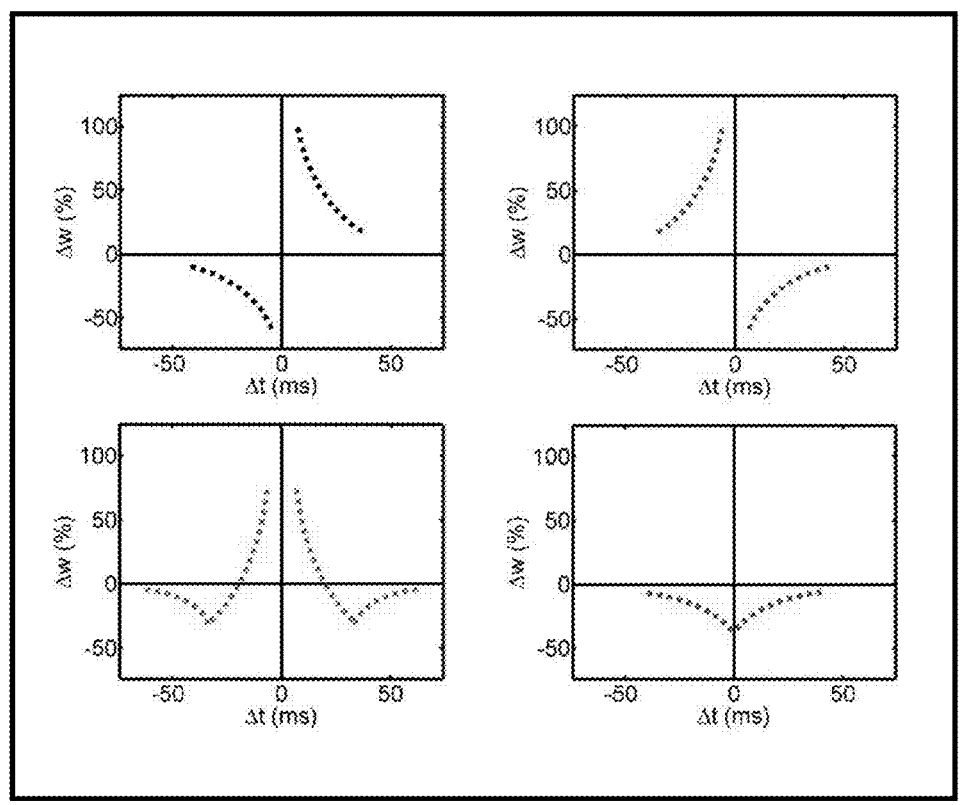
FIG. 6 shows four example target STDP behavior functions h($\Delta$t) contemplated by the present invention.

FIG. 6 shows four example target STDP behavior functions $h(\Delta t)$ contemplated by the present invention. The target STDP behavior function describes a desired relative change in synaptic weight of the neuromorphic memory cells based on $\Delta t=t_2-t_1$. The synaptic weight is inversely proportional to the electrical resistance of the resistive memory cell. It is noted that the target STDP behavior functions are not limited to the four shown. In one embodiment of the invention, the STDP behavior function h approaches zero as an absolute value of $t_2-t_1$ increases.

Figure 7:
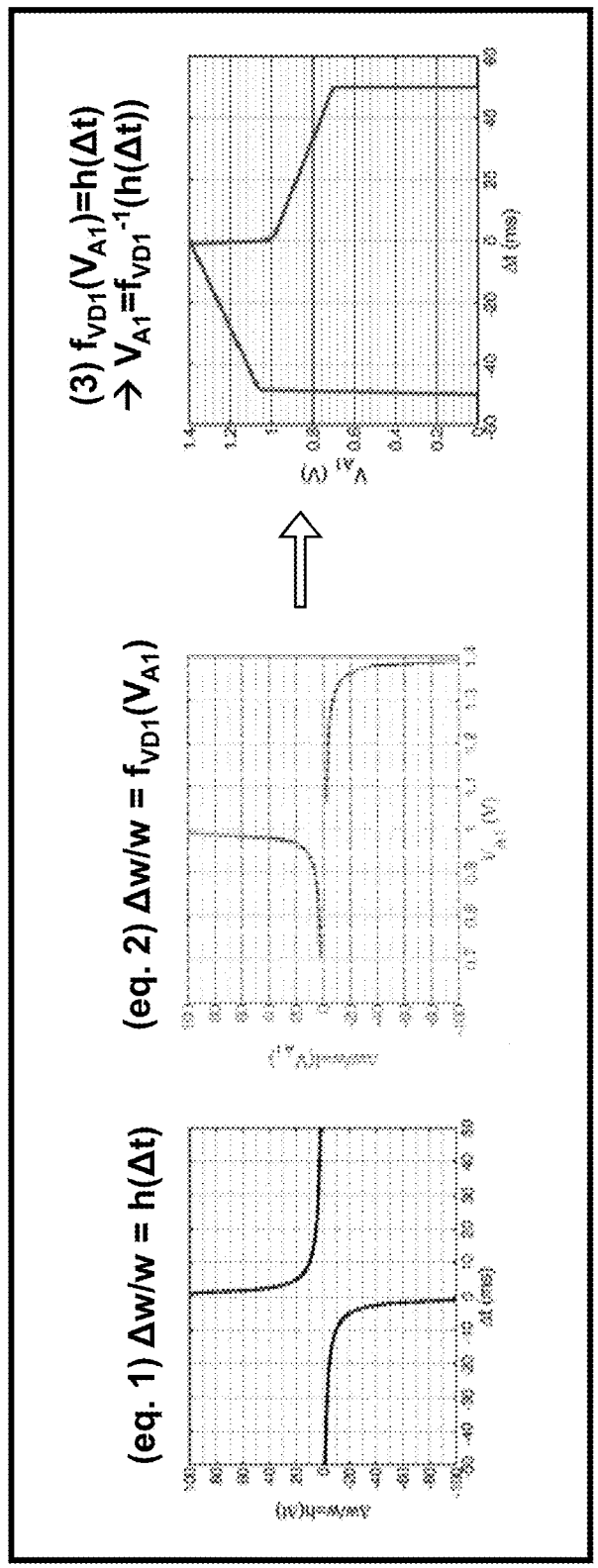
FIG. 7 shows generation of the presynaptic STDP pulse as the combination of functions h($\Delta$t) and $f_{VD1}(V_{A1})$.

FIG. 7 shows generation of the presynaptic STDP pulse 502 as the combination of functions $h(\Delta t)$, equation 1, and $f_{VD1}(V_{A1})$, equation 2. It is noted that $\Delta w/w=h(\Delta t)$ (equation 1) is the equation for STDP programming to be implemented. If the relative change in synaptic weight of synaptic memory cell, $\Delta w/w$, is determined by the non-zero voltage on $A1(V_{A1})$ when the voltage is $V_{D1}$ on D1, it can be written as $\Delta w/w=f_{VD1}(V_{A1})$ (equation 2). Using equation 1 and equation 2, one can find $V_{A1}$ for any given $\Delta t$, which results in the same $\Delta w/w$. Thus, $V_{A1}=f_{VD1}^{-1}(\Delta w/w)$, which equals $f_{VD1}^{-1}(h(\Delta t))$.

Thus, when the presynaptic circuit 126 starts sending the presynaptic STDP pulse 502 at $t_1$, the presynaptic STDP pulse 502 is such that amplitude would be $f_{VD1}^{-1}(h(t_2-t_1))$ when the postsynaptic circuit 108 fires at time $t_2$. However, this requires the presynaptic driver circuit 126 to start sending the presynaptic STDP pulse 502 even before it actually fires at $t_1$. To overcome this issue, time is shifted by a time constant $-\min(\Delta t)$. Thus, the postsynaptic circuit 108 starts sending the postsynaptic STDP pulse 504 at time $t_2-\min(\Delta t)$.

Figure 8:
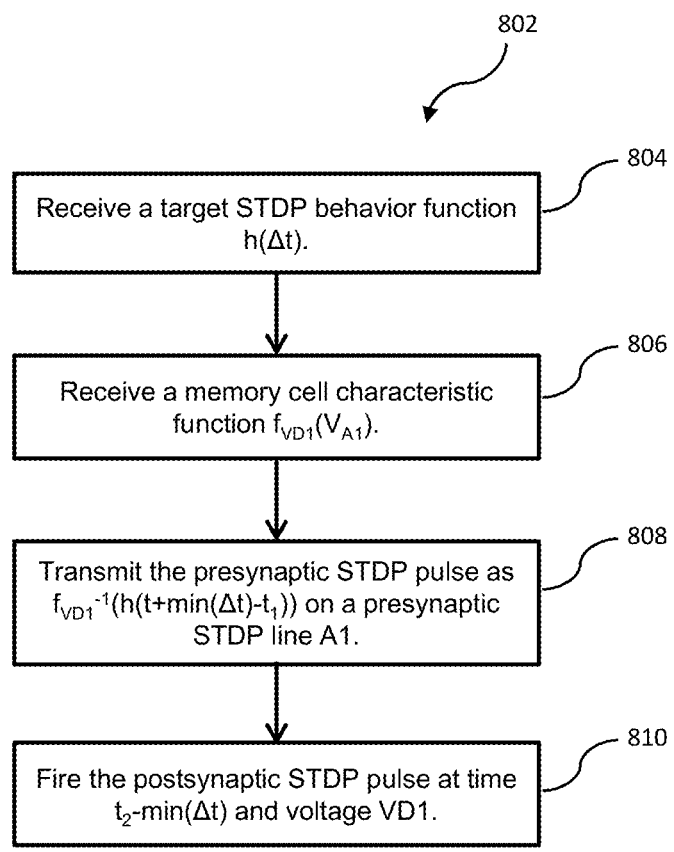
FIG. 8 shows a method for generating a memory program pulse in a neuromorphic memory circuit, according to one embodiment of the present invention.

FIG. 8 shows a method 802 for generating a memory program pulse in a neuromorphic memory circuit, according to one embodiment of the present invention. The method 802 contemplates a neuromorphic memory circuit that includes a presynaptic neuron circuit coupled to a postsynaptic neuron circuit by a resistive memory cell, as described above. The method steps are shown in chronological order for illustration purposes only. Operations may execute concurrently and/or in a different order than illustrated without departing from the spirit and scope of the present invention.

The method 802 begins at receiving operation 804. During this operation, a target STDP behavior function $h(\Delta t)$ is received, where $\Delta t=t_2-t_1$, where $t_1$ is a starting time of a presynaptic STDP pulse generated on the presynaptic STDP line, that is, the time when the presynaptic neuron fires, and where $t_2$ is the time when the postsynaptic neuron fires. The target STDP behavior function $h(\Delta t)$ describes a desired relative change in synaptic weight of the resistive memory cell based on $\Delta t$. In one embodiment of the present invention, the synaptic weight of the resistive memory cell is inversely proportional to its electrical resistance. In one embodiment of the present invention, the STDP behavior function $h(\Delta t)$ approaches zero as an absolute value of $\Delta t$ increases.

At receiving operation 806, a memory cell characteristic function $f_{VD1}(V_{A1})$ is received, where $V_{A1}$ is an amplitude of the presynaptic STDP pulse, and where VD1 is an amplitude of the postsynaptic STDP pulse. The memory cell characteristic function $f_{VD1}(V_{A1})$ describes a relationship between change in an electrical resistance of the resistive memory cell and $V_{A1}$ at a constant VD1.

At transmitting operation 808, the presynaptic STDP pulse is transmitted as $f_{VD1}^{-1}(h(t+\min(\Delta t)-t_1))$ on a presynaptic STDP line A1, where t is time and $\min(\Delta t)$ is a constant time shift. The presynaptic STDP pulse controls a current flow through the resistive memory cell when the postsynaptic STDP pulse is generated. After transmitting operation 808 is completed, process flow passes to firing operation 810.

At firing operation 810, the postsynaptic STDP pulse is generated at time $t_2-\min(\Delta t)$ and amplitude VD1. In one embodiment, the postsynaptic STDP pulse is a short, square pulse configured to program the memory element to relative synaptic weight dictated by presynaptic STDP pulse.

FIGS. 9A and 9B show an example presynaptic STDP pulse A1 and an example postsynaptic STDP pulse D1 at a $\Delta t$ less than zero (FIG. 9A) and at a $\Delta t$ greater than zero (FIG. 9B). As shown, the presynaptic STDP pulse A1 magnitude significantly decreases approximately half way through the pulse ($t_1-\min(\Delta t)$). Thus, if $\Delta t$ ($t_2-t_1$)>0, the postsynaptic STDP pulse is transmitted during the lower magnitude portion of the presynaptic STDP pulse and the phase change material is programmed toward the lower-resistance, set state. If $\Delta t$ ($t_2-t_1$)<0, the postsynaptic STDP pulse is transmitted during the higher magnitude portion of the presynaptic STDP pulse and the phase change material is programmed toward the higher-resistance, reset state. In this manner, the memory element simulates synapses that are strengthened if the firing of their presynaptic neuron precede the firing of the postsynaptic neuron, and weakened if the firing of their presynaptic neuron follow the firing of the postsynaptic neuron.

In FIG. 9A the postsynaptic neuron fires before the presynaptic neuron fires. Thus, the overlap of the STDP pulses occurs at a relatively high presynaptic STDP pulse amplitude, causing the phase change memory in the memory cell to be programmed in the high resistance RESET state.

In FIG. 9B the postsynaptic neuron fires after the presynaptic neuron fires. Thus, the overlap of the STDP pulses occurs at a relatively low presynaptic STDP pulse amplitude, causing the phase change memory in the memory cell to be programmed in the low resistance SET state.

Figure 10:
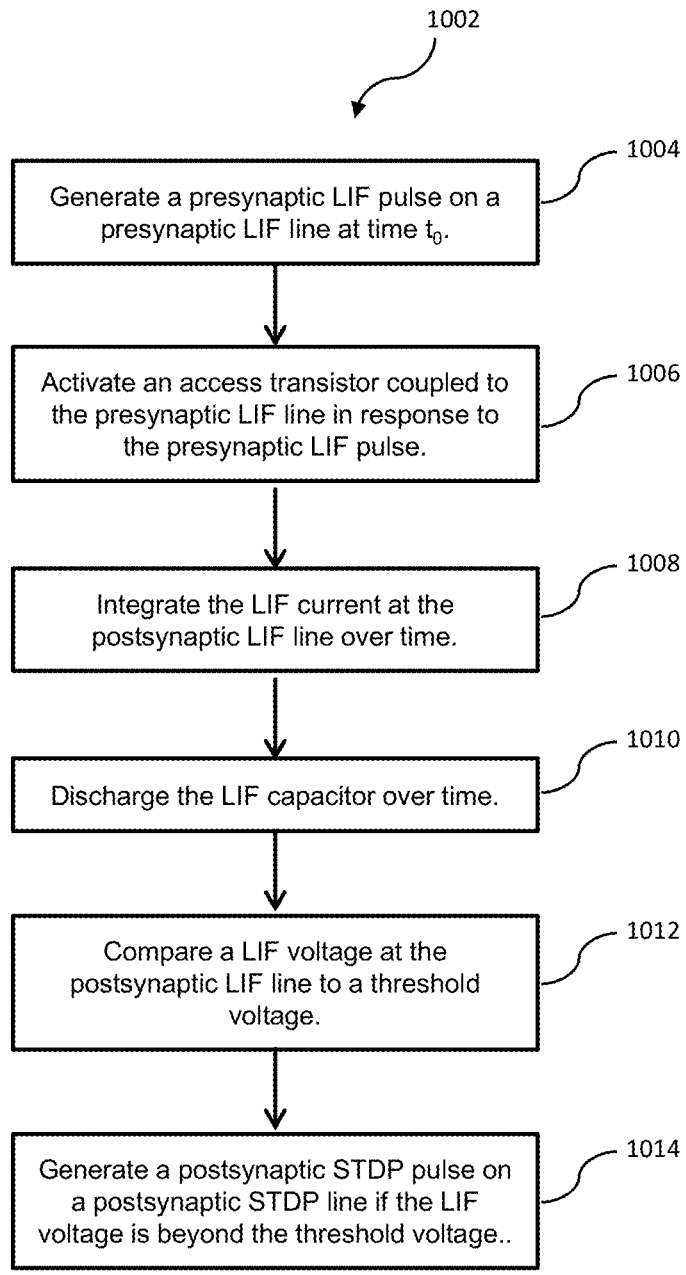
FIG. 10 shows a method for controlling a neuromorphic memory system, according to one embodiment of the present invention.

FIG. 10 shows a method 1002 for controlling a neuromorphic memory system, according to one embodiment of the present invention. The method 1002 contemplates a neuromorphic memory system that includes a presynaptic neuron circuit coupled to a postsynaptic neuron circuit by a resistive memory cell, as described above. The method steps are shown in chronological order for illustration purposes only. Operations may execute concurrently and/or in a different order than illustrated without departing from the spirit and scope of the present invention.

The method 1002 begins at generating operation 1004. During this operation, a presynaptic LIF pulse is generated on a presynaptic LIF line at time $t_1$.

At activating operation 1006, an access transistor coupled to the presynaptic LIF line is activated in response to the presynaptic LIF pulse. The access transistor enables LIF current to pass through the resistive memory cell to a postsynaptic LIF line.

When the synaptic memory cell receives the presynaptic LIF pulse on its presynaptic LIF line, the access transistor is turned on. This generates current signal $I_{ij}(t)$ on its postsynaptic LIF line proportional to the stored weight. If a resistive memory element is used to store the weight, such as phase change memory, metal oxide memory and magnetic tunnel junction, the stored weight is proportional to $1/R_{ij}$, such that $I_{ij}(t)=V/R_{ij}$.

At integrating operation 1008, the LIF current at the postsynaptic LIF line is integrated over time. As discussed above, signals generated by multiple synaptic cells on the same postsynaptic LIF line are combined into $I_j(t)=\Sigma I_{ij}(t)$. In one embodiment, integrating the LIF current is performed by a LIF capacitor electrically coupled to the postsynaptic LIF line.

The method 1002 may include discharging operation 1010. During discharging operation 1010, the LIF capacitor is slowly discharged over time. Leakage in the neuron circuit may be represented by leakage current, $I_{leak}$. $I_j(t)$ and $I_{leak}$ are integrated into $V_j(t)$ by the capacitor, C, in the neuron circuit, resulting in $V_j(t)=[\int(I_j(t)+I_{leak})dt]/C$.

As the integrating operation 1008 is performed, comparing operation 1012 compares the LIF voltage $V_j(t)$ at the postsynaptic LIF line to a threshold voltage $V_{th}$. In one embodiment, comparing the LIF voltage $V_j(t)$ to the threshold voltage $V_{th}$ is performed by a LIF comparator.

At generating operation 1014, a postsynaptic STDP pulse on a postsynaptic STDP line is generated if the LIF voltage is beyond the threshold voltage. In one embodiment, the LIF comparator is configured to generate the postsynaptic STDP pulse if the LIF voltage is beyond the threshold voltage. For example, if $V_j(t)>V_{th}$, neuron circuit j fires.

Figure 11:
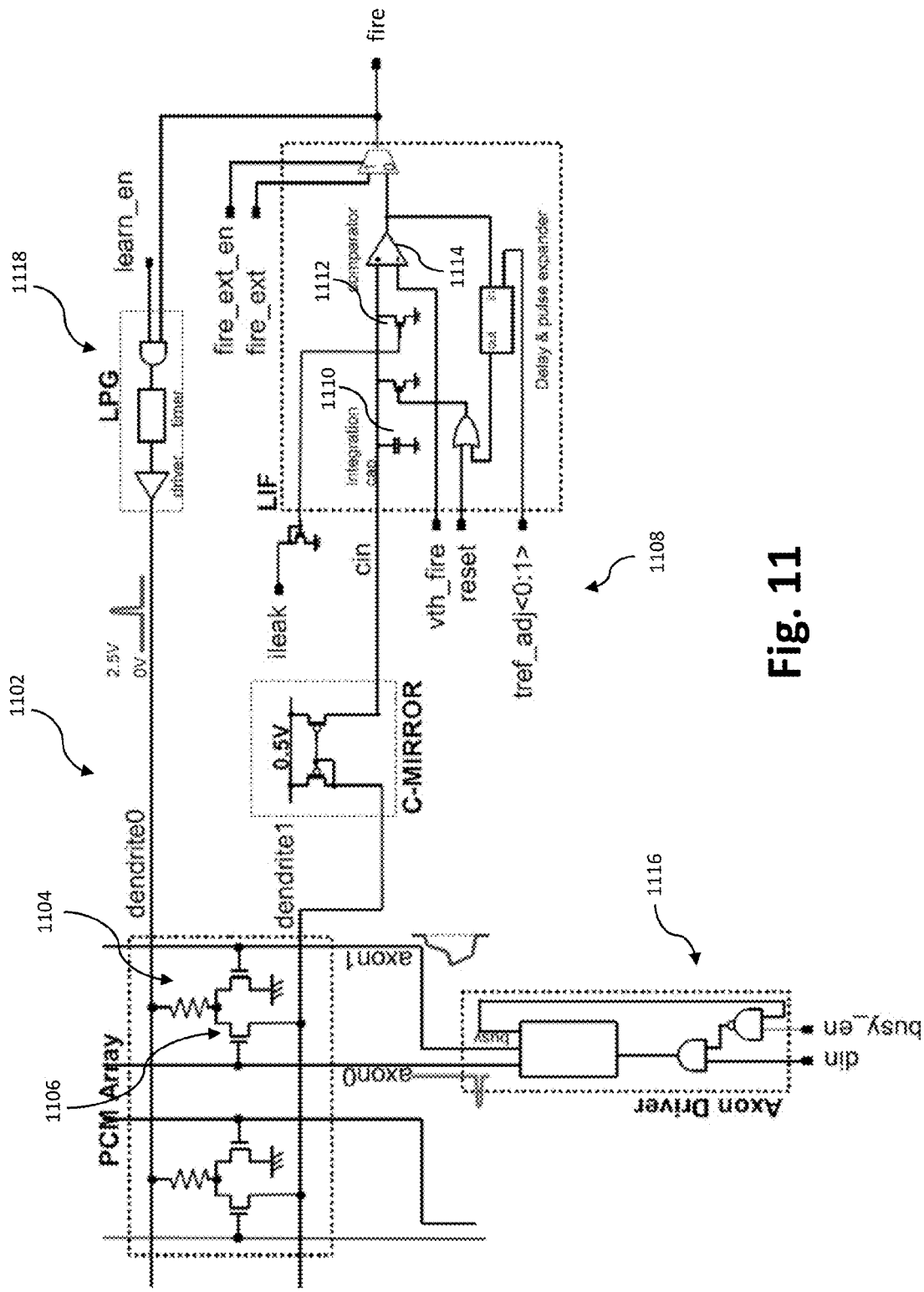
FIG. 11 shows an example neuromorphic memory system contemplated by the present invention.

FIG. 11 shows an example neuromorphic memory system 1102 contemplated by the present invention. The neuromorphic memory system 1102 includes a resistive memory cell 1104. In one embodiment, the resistive memory cell 1104 may include a phase change material.

In one embodiment, the phase change material has an electrical resistance and is programmable to a set state having a set electrical resistance and reset state having a reset electrical resistance at least a factor of 10 greater than the set electrical resistance. The phase change material includes an initial state having an initial electrical resistance between the set electrical resistance and the reset electrical resistance. The initial state is at a lower potential energy than the set state and the reset state such that the electrical resistance of the phase change material programmed to the set state or the reset state drifts toward the initial electrical resistance over time. Thus, in a particular embodiment, the resistance of the memory cell is inversely proportional to the synaptic weight. It is contemplated that other resistive memory elements may be used, such as metal oxide memory or magnetic tunnel junction to store the synaptic weight.

A presynaptic neuron circuit 1116 is configured to generate a presynaptic LIF pulse on a presynaptic LIF line (axon0) at time $t_1$. An access transistor 1106 coupled to the presynaptic LIF line is activated in response to the presynaptic LIF pulse. The access transistor 1106 enables LIF current to pass through the resistive memory cell to a postsynaptic LIF line (cin).

The neuromorphic memory system 1102 includes a postsynaptic neuron circuit 1108. The postsynaptic neuron circuit 1108 includes a LIF capacitor 1110 electrically coupled to the postsynaptic LIF line. The LIF capacitor 1110 is configured to integrate the LIF current at the postsynaptic LIF line over time.

The postsynaptic neuron circuit 1102 further includes a LIF discharge line 1112 coupled to the postsynaptic LIF line. The LIF discharge line is configured to discharge the LIF capacitor 1110 over time. A LIF comparator 1114 is electrically coupled to the postsynaptic LIF line. The LIF comparator 1114 is configured to compare a LIF voltage at the LIF capacitor 1110 to a threshold voltage (vth_fire) and trigger learning pulse generator (LPG) 1118 to generate the postsynaptic STDP pulse on a postsynaptic STDP line (dendrite0) if the LIF voltage is beyond the threshold voltage. In other words, when the integrated signals crosses the threshold, the neuron circuit fires.

Figure 12:
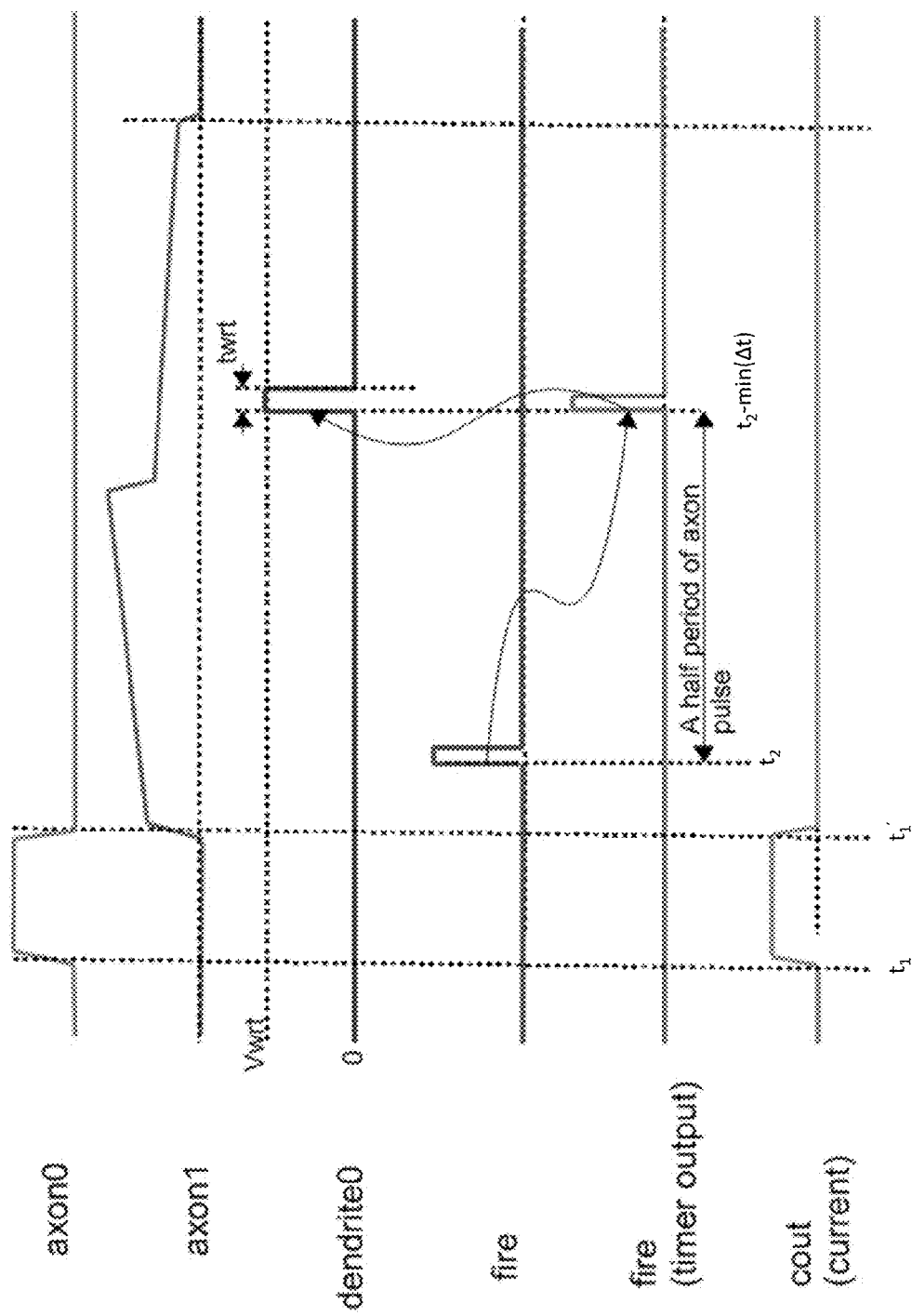
FIG. 12 shows an example timing diagram for the neuromorphic memory system of FIG. 11.

FIG. 12 shows an example timing diagram for the neuromorphic memory system 1102 of FIG. 11. The timing diagram begins with the presynaptic LIF pulse (axon0 signal) being generated at time $t_1$. This is followed by the presynaptic STDP pulse (axon1 signal) being started at time $t_1'$. In this example, constant time shift, min($\Delta t$), is chosen such that $t_1'>t_1$, which guarantees that the presynaptic STDP pulse would not overlap with the presynaptic LIF pulse and the LIF current is proportional to the stored weight. Between $t_1$ and $t_1'$, current is output by the memory cell (cout) and is integrated by the postsynaptic neuron circuit 1108. As the current is integrated, the LIF voltage moves beyond the threshold voltage and the LIF comparator 1114 fires (fire signal) at $t_2$. The signal from the LIF comparator 1114 is delayed by $-\min(\Delta t)$ and a postsynaptic STDP pulse (dendrite0) is generated at time $t_2-\min(\Delta t)$.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A neuromorphic memory system comprising:
  a plurality of neuromorphic memory arrays, each of the neuromorphic memory arrays including rows and columns of neuromorphic memory cells;
  a column of postsynaptic circuits, each of the postsynaptic circuits electrically coupled to a plurality of postsynaptic spike timing dependent plasticity (STDP) lines, each of the postsynaptic STDP lines coupled to a row of neuromorphic memory cells at a respective memory array of the memory arrays;
  a column of summing circuits, each of the summing circuits electrically coupled to a plurality of postsynaptic leaky integrate and fire (LIF) lines, each of the postsynaptic LIF lines coupled to the row of neuromorphic memory cells at the respective memory array, each of the summing circuits providing a sum of signals from the postsynaptic LIF lines to a respective postsynaptic circuit of the postsynaptic circuits.

2. The neuromorphic memory system of claim 1, further comprising:
wherein the signals from the postsynaptic LIF lines are current signals; and
wherein each of the summing circuits includes a plurality of current amplifiers, each of the current amplifiers is coupled to and receives current from a respective postsynaptic LIF line of the postsynaptic LIF lines, each of the current amplifiers is coupled at an output to the postsynaptic circuit.

3. The neuromorphic memory system of claim 2, further comprising:
a plurality of presynaptic LIF lines;
a plurality of presynaptic STDP lines;
a column of neuromorphic memory cells at the respective memory array, the column of neuromorphic memory cells is coupled to a respective presynaptic LIF line of the presynaptic LIF lines and a respective presynaptic STDP line of the presynaptic STDP lines;
a plurality of presynaptic driver circuit rows, each of the presynaptic driver circuit rows is coupled to a respective neuromorphic memory array of the neuromorphic memory arrays, each of the presynaptic driver circuit rows including a plurality of presynaptic driver circuits, each of the presynaptic driver circuits is coupled to the respective presynaptic LIF line and the respective presynaptic STDP line.

4. The neuromorphic memory system of claim 3, wherein each of the presynaptic driver circuits:
generates a presynaptic LIF pulse on the respective presynaptic LIF line at time t1; and
activates an access transistor coupled to the respective presynaptic LIF line in response to the presynaptic LIF pulse, the access transistor enabling LIF current to pass through the neuromorphic memory cells to the respective postsynaptic LIF line.

5. The neuromorphic memory system of claim 4, wherein each of the postsynaptic circuits:
integrates the LIF current at an output of a respective summing circuit of the summing circuits over time;
compares an LIF voltage at the output of the respective summing circuit to a threshold voltage; and
generates a postsynaptic STDP pulse at time t2 min($\Delta$t) on the respective postsynaptic STDP line if the LIF voltage is beyond the threshold voltage, where min($\Delta$t) is a constant time shift.

6. The neuromorphic memory system of claim 5, wherein each of the presynaptic driver circuits transmits a presynaptic STDP pulse at the respective presynaptic STDP line as fVD1 1(h(t+min($\Delta$t) t1)), where t is time, h is a target STDP behavior function describing a desired relative change in synaptic weight of the neuromorphic memory cells based on the time difference between when the postsynaptic neuron fires (t2) to generate the postsynaptic STDP pulse on a respective postsynaptic STDP line at t2−min($\Delta$t) and the presynaptic STDP pulse is generated on the respective presynaptic STDP line (t1), and fVD1 is a memory cell characteristic function describing a relationship between change in an electrical resistance of the neuromorphic memory cells and a voltage of the presynaptic STDP pulse at a voltage of the postsynaptic STDP pulse, the presynaptic STDP pulse controlling a current flow through a respective neuromorphic memory cell when the postsynaptic STDP pulse is generated.

7. The neuromorphic memory system of claim 6, wherein the synaptic weight of the resistive memory cells is inversely proportional to the electrical resistance of the resistive memory cell.

8. The neuromorphic memory system of claim 6, wherein the STDP behavior function h approaches zero as an absolute value of t2−t1 increases.

9. The neuromorphic memory system of claim 5, wherein each of the postsynaptic circuits includes a LIF capacitor electrically coupled to the output of the respective summing circuit, the LIF capacitor configured to integrate the LIF current over time.

10. The neuromorphic memory system of claim 9, wherein each of the postsynaptic circuits includes a LIF discharge line coupled to the output of the respective summing circuit, the LIF discharge line configured to discharge the LIF capacitor over time.

11. The neuromorphic memory system of claim 10, wherein each of the postsynaptic circuits includes a LIF comparator electrically coupled to the output of the respective summing circuit, the LIF comparator configured to compare the LIF voltage to the threshold voltage and generate the postsynaptic STDP pulse if the LIF voltage is beyond the threshold voltage.

* * * * *